UNITED STATES PATENT OFFICE.

AKOS VON SIGMOND AND RUDOLF GENGE, OF KLAUSENBURG, AUSTRIA-HUNGARY.

PROCESS OF MAKING YEAST.

SPECIFICATION forming part of Letters Patent No. 461,774, dated October 20, 1891.

Application filed November 15, 1890. Serial No. 371,581. (No specimens.)

*To all whom it may concern:*

Be it known that we, AKOS VON SIGMOND and RUDOLF GENGE, both of Klausenburg, in the Kingdom of Hungary, citizens of the Empire of Austria-Hungary, have invented certain new and useful Improvements in Processes of Making Yeast and Alcohol from Starch-Containing Substances, of which the following is a specification.

This invention relates to an improved process of making yeast and alcohol from starch-containing substances, which process consists mainly in the separation of the liquid and solid parts of the mash in a clear wort from which all solid particles are removed, and which contains a sufficient quantity of sugar and protein substances that are favorable to the formation of yeast, while the solid substances that are obtained from the mash in the form of cakes are utilized as a food for cattle. The clear wort is then fermented with yeast, and during the fermentation purified air is forced through the wort. When the fermentation of the wort is completed, the yeast is separated by mechanical means from the same and pressed out, while the remaining liquor that contains no yeast-cells is distilled for the alcohol contained therein. The wort is prepared from substances containing starch, such as starch-flour, corn, rice, cereals, potatoes, &c., the starch being saccharified in the usual manner, either with malt or with mineral acids under high pressure. By using malt for the saccharification of the starch, the substances which are to be mashed are first sufficiently broken up and then subjected to the action of steam and slightly-acidulated water, either in a mash-tub or in a boiler under high pressure, and then saccharified with malt according to the usual mashing process. When the starch is saccharified with mineral acids under high pressure the starch-containing substances are subjected in a boiler made of acid-resisting material to a steam-pressure of from one to four atmospheres, they being first moistened with acidulated water containing from two to four per cent. of acid in the proportion of a quart to two pounds of mashed substances. According to the quality and composition of the starch-containing substances, the mash is held under the steam-pressure for from twenty to one hundred and twenty minutes, until the formation of dextrose is entirely completed, after which the acid in the mash is neutralized down to one per cent. of acid by means of carbonate of soda or any other suitable alkali.

For introducing the required quantity of protein substances in the mash obtained by either one of the above-described saccharification processes, from five to twenty-five per cent. of the steamed raw material, according to the quantity of protein contained therein, are broken up or comminuted and then mixed with a cold and slightly-acidulated water and allowed to stand for from fifteen to twenty hours. The thus treated mass is then raised by steaming it to a temperature that is most favorable for saccharification and retained at this temperature for about two hours. The mixing of the starchy substances has to take place from fifteen to twenty hours before the saccharification of the before-mentioned mash. The mash last obtained is next mixed with the mash which was saccharified by means of malt or mineral acids under pressure and then forced while still warm through a filter-press, or filtered in any other suitable manner, so that a clear wort is obtained. The cakes that are retained in the press or the residues that are obtained by other known filtering methods, can be utilized as a food for cattle, and can be shipped after thoroughly drying the same. The clear wort which is thus obtained, as before described, is mixed with water until about ten per cent. of sugar is contained therein, and then forced through a filtering apparatus containing asbestus or cellulose, such as are used in the fermentation of beer, so that a perfectly clear liquid is obtained, which by subsequent fermentation produces besides yeast no other solid sediments. This perfectly clear wort is transferred to a fermenting-vat and mixed with compressed yeast and fermented at a temperature of from 20° to 24° Reaumur. During the fermentation purified atmospheric air is freely permitted to pass through the wort. The air is purified by passing it through a suitable purifying apparatus, which is filled with strongly-acidulated water, which water retains all the bacteria and supplies the air in a perfectly purified state. In place of the purified air ozonized air may be used. The purified air or ozonized air is uniformly distributed through the wort by providing the fermenting-vat with a second or false perforated bottom at some distance above the bottom, and forcing the purified or ozonized air while the fermentation is going on into the space between the two bottoms and distributing it by means of the perforated false bottom throughout the wort. The air accelerates the formation of the yeast-cells, while the even distribution of the air prevents the agitation and foaming of the wort, so that the evaporation of alcohol is reduced to a very small percentage. The fermentation is completed in about eight to twelve hours, upon which the wort is drawn off into wooden vessels, in which the yeast sets in a few hours, while the liquor standing on the yeast is drawn off and subjected to distillation for obtaining the alcohol from the same. The yeast is washed with water and the moisture removed from the same by pressure. When there is a lack of space for the shallow settling-vessels, the yeast can also be separated from the yeast-containing liquor by centrifugal machines. The yeast and alcohol obtained depend to some extent on the materials used in the above-described process, which furnishes from twenty-four to forty per cent. of sound and durable yeast and from twenty to twenty-four per cent. of alcohol from two hundred pounds of raw materials.

The advantages of our improved process are: first, the production of comparatively large quantities of yeast and alcohol containing no fusel-oil from the substances employed, while the use of the expensive malt is greatly decreased.

A further advantage is that by using the high-pressure mashing process raw materials can be used, which not only contains a larger quantity of sugar, but which are also much cheaper than the substances which were heretofore employed in the manufacture of compressed yeast.

Another advantage consists in the production of a wort which is not favorable to the generation of bacteria, that are injurious to yeast, so that a very durable yeast is the result.

A final advantage is the utilization of the cakes obtained in the filtration process in solid form, so that the same can be more conveniently shipped than the liquid swill used as feed.

Having thus described our invention, we claim as new and desire to secure by Letters Patent—

The process herein described of producing yeast from starch-containing substances, which consists in the following steps: treating the raw material with acid, holding the mash under steam-pressure until the formation of dextrose is completed, then neutralizing the excess of acid in the mash, adding a second protein-containing mash produced by steaming raw material mixed with acidulated water until it is saccharified, mixing this second mash with the first mash, filtering the entire mash to obtain a clear wort, fermenting the clear wort by an addition of yeast while simultaneously passing clarified or ozonized air through the wort, and finally separating the yeast from the fermented wort, substantially as set forth.

In testimony that we claim the foregoing as our invention we have signed my names in presence of two subscribing witnesses.

AKOS VON SIGMOND.
RUDOLF GENGE.

Witnesses:
E. LIEBING,
W. HAUPT.